May 30, 1961  J. R. OISHEI ET AL  2,985,903
WINDSHIELD CLEANER SYSTEM
Filed July 16, 1957
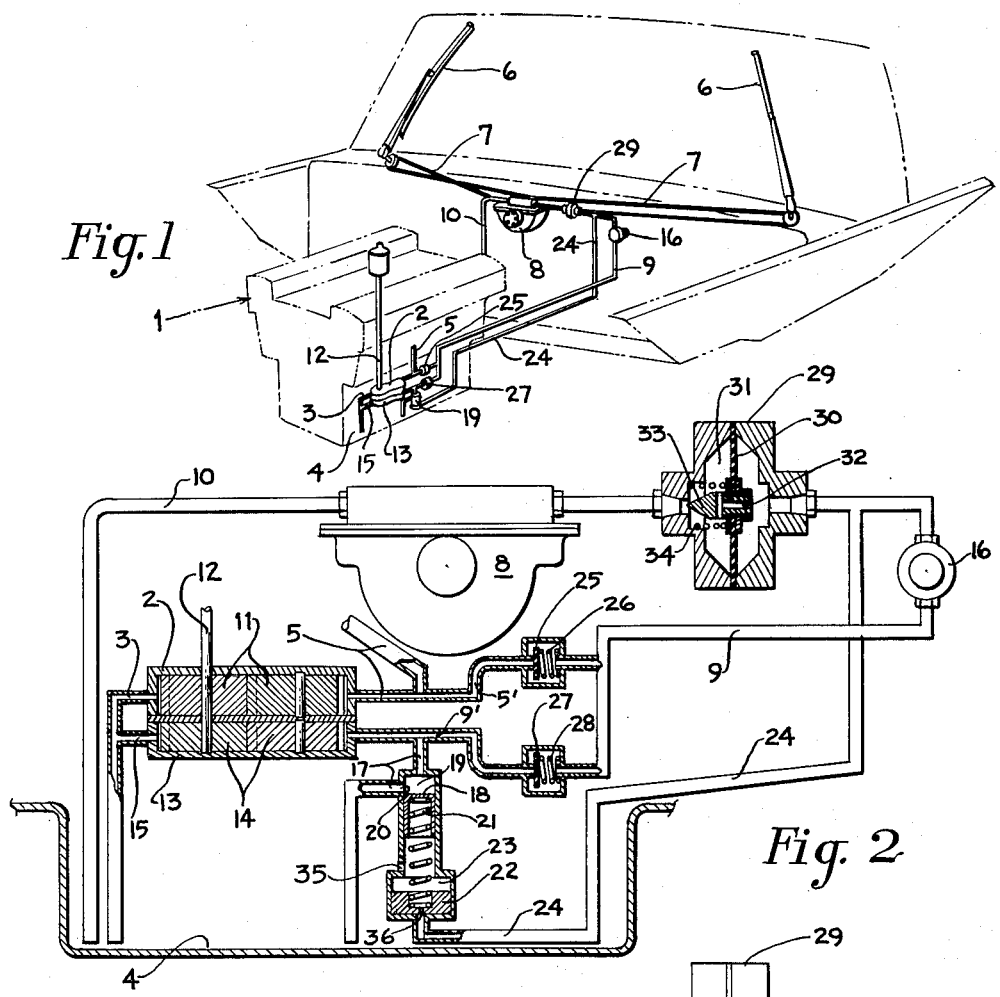
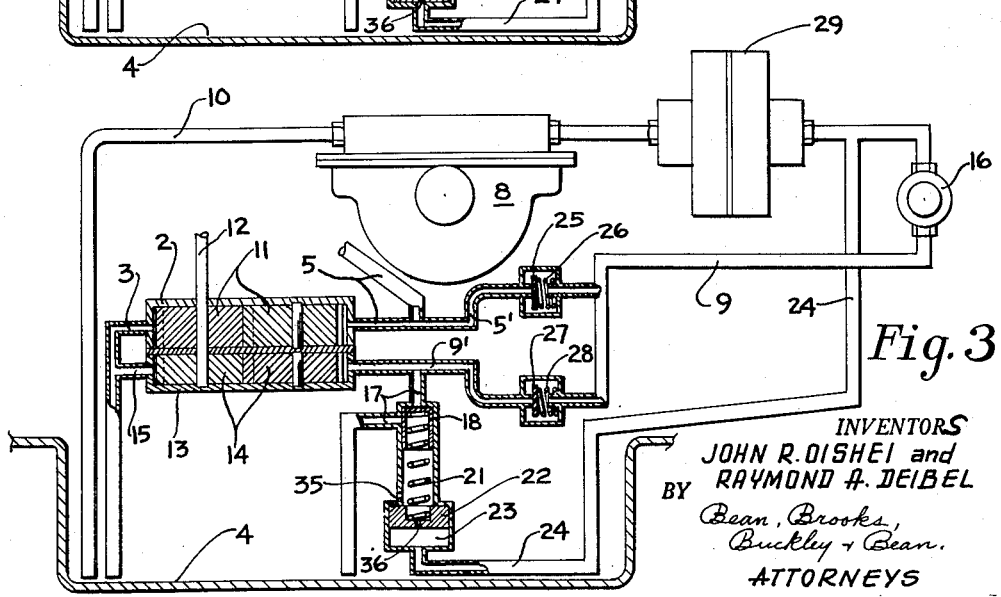
INVENTORS
JOHN R. OISHEI and
RAYMOND A. DEIBEL
BY Bean, Brooks,
Buckley + Bean.
ATTORNEYS

United States Patent Office 2,985,903
Patented May 30, 1961

2,985,903

WINDSHIELD CLEANER SYSTEM

John R. Oishei, Buffalo, and Raymond A. Deibel, Cheektowaga, N.Y., assignors to Trico Products Corporation, Buffalo, N.Y.

Filed July 16, 1957, Ser. No. 672,227

23 Claims. (Cl. 15—250.12)

This invention relates to a motor vehicle windshield cleaner system and especially to one of the hydraulic type.

It has heretofore been proposed to operate a windshield cleaner hydraulically directly off the lubricating system but such system as a source of pressure has been impractical primarily because of the fluctuating characteristic of the pressure which during idling operation of the engine drops to a degree impractical for wiper operation. The pressure range in the modern lubricating system has approximately a low limit of ten pounds and a high of thirty pounds.

With the present day deeply curved windshields and the larger and heavier wiping equipment, wiper motors with a greater torque output are required to maintain wiper operation. The more commonly used vacuum and electric motors have torque limitations to cope with heavier imposed wiper loads. Hydraulic actuation affords greater torque needed for efficient wiping performance and is desirable where ample pressure differential is available in the mobile power plant.

The primary object of the invention is to provide a windshield cleaner system operable by hydraulic power economically supplied by the vehicle power plant. According to the illustrated embodiment of the present invention a double duty engine driven pump assembly is provided for circulating a secondary supply of fluid separate and distinct from that of the engine lubricating system. Plural pumps are preferably arranged in stacked order and driven by a common shaft which latter is normally used at all times for the primary or oil pump of the lubricating system. Two separate pairs of spur gears are employed to provide plural pumping units, each of which latter function independently of the other, and the secondary pump functioning part time and with a much lower displacement than the primary or oil pump. The secondary pump while running all the time is not working against pressure except when the windshield cleaner is turned on. Both pumps take oil from the engine crankcase, and when the secondary pump is ineffective in the windshield cleaner system its displacement is returned to the crankcase sump through a normally open bypass. A hydrostatic coupler is associated with the bypass to hydraulically couple the secondary pump to the cleaner motor, this being effected by throttling the bypass to raise the pressure for accessory operation. The part time use of the continuously running secondary pump is accomplished by the fluid coupling and uncoupling of the pump to the windshield cleaner automatically and without any added mechanism. When the wiper control is turned on, the hydrostatic coupler responds to the line pressure and moves a bypass throttling valve for restricting the escape of fluid and effecting such desired build-up in pressure.

This build-up in hydrostatic pressure is employed to operate the cleaner motor at its normally expected performance of approximately 170 strokes per minute over a panoramic pattern or, at the selection of the motorist, at a faster frequency of 240 strokes per minute over a reduced pattern for super-highway travel. Upon first turning on the windshield cleaner a very small portion of the pressurized fluid from the lubricating system is admitted to the pressure line to initiate the functioning of the hydrostatic coupler, but immediately thereafter the secondary pump pressure build-up takes over for as long as the windshield cleaner remains in use. The higher pressure developed by this secondary part-time pump provides instant wiper action at colder temperatures whereever a wiper motor normally is expected to be used, the pressure available acting to overcome the crankcase oil viscosity in its heaviest congealed state. When the use of the cleaner is discontinued the secondary pump will merely idle with little if any appreciable increase in the working load on the common drive shaft.

It is a further object of the invention to provide a windshield cleaner system that is operable by oil taken from the crankcase and pressurized in a manner to insure adequate pressure for wiper actuation at all times without disturbing the purpose and functioning of the lubricating system.

The invention further resides in a unique hydraulic windshield cleaner combination wherein a portion of the lubricant content of the engine is pressurized apart from or independently of the lubricating system and is automatically relieved of its pressure at other times to lighten the engine load when the cleaner is not in use, such being accomplished by a hydraulic coupler in response to the generated pressure.

The foregoing and other objects will manifest themselves as this description progresses, reference being made to the accompanying drawing, wherein:

Fig. 1 is a perspective view in phantom of a portion of a motor vehicle incorporating the combined system of the present invention;

Fig. 2 is a diagrammatic layout showing the arrangement with the windshield cleaner shut off;

Fig. 3 is a similar view showing the relation of parts when the cleaner is turned on.

Referring more particularly to the drawing, the numeral 1 designates the internal combustion power plant of a motor vehicle and 2 its lubricating pump having an inlet pipe 3 from the sump 4 and an outlet pipe 5 leading to the usual lubricating passages of the engine. The maximum oil pressure in the lubricating system of the modern automobile is determined by means of a bypass valve (not shown). The windshield wipers 6 are connected by the cable transmission 7 to a wiper motor 8 having an inflow conduit 9 and an outflow conduit 10, the latter discharging back into the sump 4. The lubricating pump 2 is of usual construction having a pair of intermeshing gears 11, one of them being driven by a shaft 12 from the engine cam shaft in the usual manner.

A second pump 13 underlies the oil pump 2 and comprises intermeshing gears 14, one of them being fixed to an extension of the gear shaft 12 for joint operation of both pumps. Preferably, this second pump 13 is of smaller displacement and has an inlet 15 opening into the sump 4 and its outlet connected to the wiper motor 8 by the inflow conduit 9. A control valve 16 is interposed in the conduit 9, which latter now becomes the pressure line. When the windshield cleaner is turned off, the pump displacement is bypassed back to the sump through a connection 17 leading off from a manifold portion 9' of the pressure line. This bypass also carries off excess pump displacement over and above the requirement for the windshield cleaner in operation. Thus there is provided a pump assembly or pump unit capable of delivering fluid at variable pressures in accordance with requirement, either to the same pressure line or to a separate pressure line.

Arranged in the bypass 17 is a hydrostatic coupler unit comprising a valve 18 operating within a cylindrical chamber 19 to open and close a lateral escape port 20. The valve 18 is backed by a coil spring 21 which rests at its lower end on a piston 22 operating as a servo-motor within a pressure chamber 23. A pressure feed-back passage 24 connects the pressure chamber 23 to the pressure line 9 at a point beyond the control valve 16 so that when the windshield cleaner is in operation the chamber will be pressurized and when the cleaner is not in use the chamber will be devoid of pressure. With the chamber pressurized, the spring supporting piston 22 is lifted along with its spring and the valve 18 to close the port 20, as depicted in Fig. 3, with the result of a build-up in the line pressure to the motor. When the control valve 16 is closed, the coupler unit 18, 21, 22 will move to a port opening position, Fig. 2.

The outlet pipe 5 from the oil pump 2 is connected to the pressure line 9 by an extension 5', and arranged within this extension is a check valve 25 backed by a spring 26 for closing to preclude the higher pressure from the pressure line 9 entering and disrupting the lubricating system. A second check valve 27 is arranged in the pressure line between the bypass 17 and the extension 5', and this valve is yieldably held closed by spring 28 to prevent the flow of lubricant into the bypass 17 from the lubricating system when the accessory is not in use.

In operation, the secondary or motor pump 13 when idling will discharge through the normally open bypass 17 back into the sump at which time the check valve 27 will remain closed to prevent the escape of oil from the lubricating system. However, the check valve 25 is admitting the pressurized lubricant from the lubricating pump 2 into the pressure line 9 up to the closed control valve.

Upon turning on the wiper motor by opening the control valve 16, the pressurized lubricant, under the relatively low pressure of the lubricating system, is momentarily admitted to the wiper motor and also through the feed-back connection 24 into the pressure chamber 23 to lift the valve 18 to a port closing position. Thereafter, the lubricating system will operate wholly independently of the windshield cleaner as the line pressure to the cleaner increases. This closing of the port 20 will arrest the flow of lubricant through the bypass 17 and build up the pressure within the pressure line 9 to the predetermined degree for motor actuation. By way of example, this build-up in pressure for accessory operation may be limited to one hundred pounds p.s.i. In building up this accessory pressure the secondary pump will take over the operation of the accessory as the check valve 27 unseats and the check valve 25 closes under the flow of the higher pressurized medium to prevent its movement into the lubricating system. Thereby, the lubricating system is protected for continuing its efficient action. As soon as the wiper is discontinued by the closing of the control valve 16, the pressure beneath the piston 22 will dissipate and the valve 18 will open to bypass the pump displacement back into the sump. Thus, the power plant of the vehicle is relieved of the unnecessary load of driving the accessory pump against a pent-up pressure head to no avail when the windshield cleaner is not in use.

There is preferably interposed in the pressure line between the feed-back connection 24 and the windshield cleaner a flow control unit 29 which holds in check a power reserve to meet changing load conditions on the motor, such as when the wipers cling to a drying windshield. This unit is designed to meter the fluid flow to the cleaner for normal operation and to increase the supply of power to the cleaner for such occasions when its motor is so abnormally loaded. The power reserve is automatically released to raise the operating pressure in the motor for carrying the wipers across the drying surface and without losing the wiping frequency. The flow regulating unit embodies a diaphragm 30 that is arranged within a chamber 31 and has a restricted communication 32 through the diaphragm-carried valve 33 for creating a pressure differential thereon under normal flow conditions to urge the valve 33 toward its seat against the urge of spring 34. However, any overloading of the motor will cause the pressure to equalize on opposite sides of the diaphragm, by reason of restriction 32, whereupon the spring 34 will lift the valve 33 from its seat and thereby provide a greater build-up in the pressure within the motor to produce a greater torque output for overcoming the wiper cling or other wiper-retarding cause and for continuing the wiping frequency. The function and purpose of this flow regulating unit is more fully described in copending application Serial No. 664,735, filed June 10, 1957.

The chambers 19 and 23 may be provided with a venting aperture 35. Also the spring supporting piston 22 may be provided with a bleed port 36 therethrough to relieve the pressure in the feed-back connection 24 after the control valve 16 is closed. The purpose of this bleeding action is to delay the loss of pressure in the feed-back connection until the wiper motor has parked the wipers. Therefore, after the wipers have been parked the pressurized oil content of the feed-back passage will spend its pressure through the bleed port 36 and out into the sump through the venting aperture 35.

Obviously, the spring 21 will determine the accessory pressure and therefore springs of different strengths may be selected for obtaining different accessory pressures. The hydrostatic coupler brings the windshield cleaner into operative relation with the normally idling pump without clutch mechanism of any kind. It wholly depends upon a pressurization in its own system. As the pressure builds up in the pressure line the valve 18 will hold it for accessory operation up to the limit determined by its supporting spring. The present construction and arrangement utilizes the lubricant body for accessory operation without disturbing the normal functioning of the lubricating system.

The foregoing description has been given in detail for clarity and without thought of limitation since the inventive principles involved are capable of assuming other physical embodiments and for operating other accessories, without departing from the spirit of the invention and the scope of the appended claims.

What is claimed is:

1. A windshield cleaner for a motor vehicle, comprising a wiper, a hydraulic motor operating the same, pump means connected to the motor by a pressure line, a control valve in the line, a normally open return-flow bypass in the pressure line between the pump means and the valve, a hydrostatic coupler interposed in the bypass and responsive to the line pressure beyond the control valve to hold the line pressure to a motor actuating degree, and means responsive to the opening of the control valve to close the bypass for rendering the coupler operative.

2. A windshield cleaner for a motor vehicle, comprising a wiper, a hydraulic motor operating the same, pump means connected to the motor by a pressure line, a control valve in the line, a return-flow bypass in the pressure line between the pump means and the valve, and a hydrostatic coupler including a spring pressed valve in the bypass normally returning fluid flow under less than motor actuating pressure and responsive to the line pressure beyond the control valve for holding the line pressure to a motor actuating degree, in combination with the lubricating system of such motor vehicle having a pressure less than such degree, and means operable to admit fluid from the lubricating system into the pressure line upon opening the control valve for rendering the coupler initially operative.

3. A windshield cleaner having a wiper, a motor operating the same, a hydraulic pump connected by a pressure line to the motor, a control valve in the pressure line, means arranged in the line between the valve and the pump and responsive to the line pressure beyond the control valve to hold the pressure to a motor actuating degree, said pressure holding means comprising a return-flow bypass and a normally open valve adjustable therein by such pressure response for restricting the bypass to maintain a build up in the line pressure for wiper actuation when the control valve is opened, and means responsive to the opening of the control valve for initially supplying pressure to so adjust the bypass valve until the pump generated pressure takes over.

4. A windshield cleaning system for motor vehicles, comprising a wiper, a hydraulic motor connected thereto for oscillating the same, an engine driven pump means connected by a pressure line to the motor and normally developing an effective pressure of a degree less than that required to actuate the motor, a control valve for the motor arranged in the pressure line, means between the pump and the control valve responsive to the line pressure beyond the control valve for providing motor actuating pressure when the control valve is open, and means responsive to the opening of the control valve for rendering the providing means operative initially.

5. A windshield cleaning system for motor vehicles, comprising a wiper, a hydraulic motor for oscillating the same, a pump connected by a pressure line to the motor, bypass means normally returning all of the pump output, a control valve for the motor arranged in the pressure line beyond the bypass means, means associated with the bypass means between the pump and the valve and responsive to the line pressure beyond the control valve for closing the bypass means to maintain the buildup in pump pressure when the control valve is open, and lubricating pump means operating at a relatively lower pressure and having its output connected to the pressure line between the control valve and the pressure maintaining means to initiate the operation of the latter when the control valve is opened.

6. A windshield cleaning system comprising a wiper, a hydraulic motor for driving the same, pump means connected to the motor by a pressure line, a control valve in the pressure line, a bypass for returning fluid to the pump means when the control valve is closed, and a hydraulic coupler responsive to the pressure in the line beyond the control valve when the latter is opened and operable to restrict the bypass to raise the line pressure for wiper operation, and means operable to initially restrict the bypass to start the coupler in operation.

7. A windshield cleaning system comprising a wiper, a hydraulic motor for driving the same, pump means connected to the motor by a pressure line, a control valve in the pressure line, a bypass for returning fluid to the pump means when the control valve is closed, a hydraulic coupler responsive to the pressure in the line beyond the control valve and operable to restrict the bypass to raise the line pressure for wiper operation, and means operable to initiate action of the coupler.

8. A windshield cleaning system comprising a wiper, a hydraulic motor for driving the same, pump means connected to the motor by a pressure line, a control valve in the pressure line, a bypass for returning fluid to the pump means when the control valve is closed, a hydraulic coupler responsive to the pressure in the line beyond the control valve and operable to restrict the bypass to raise the line pressure for wiper operation, other pressure supplying means operable to initiate such responsive action of the coupler, and bleed means operable to relieve the pressure on the coupler after the control valve is closed to continue wiper parking response of the motor to the residual pressure beyond the control valve.

9. A windshield cleaning system comprising a wiper, a hydraulic motor for driving the same, pump means connected to the motor by a pressure line, a control valve in the pressure line, a bypass for returning fluid to the pump means when the control valve is closed, a hydraulic coupler responsive to the pressure in the line beyond the control valve and operable to restrict the bypass to raise the line pressure for wiper operation, in combination with a vehicle lubricating system having a pressure passage connected to the pressure line before the control valve, a check valve in the pressure line to close against flow from the lubricating system to the bypass, and a check valve in the passage precluding motor actuating pressure flowing from the line into the lubricating system.

10. A windshield cleaning system comprising a wiper, a hydraulic motor for driving the same, pump means connected to the motor by a pressure line, a control valve in the pressure line, a bypass for returning fluid to the pump means when the control valve is closed, a hydraulic coupler responsive to the pressure in the line beyond the control valve and operable to restrict the bypass to raise the line pressure for wiper operation, said coupler including a valve supported by a spring and a servo motor so responding to the line pressure to position the spring supported valve for such bypass restriction, and means for supplying an initiating pressure for so energizing the servo motor.

11. A windshield cleaner for a motor vehicle, comprising a wiper, a hydraulic motor operating the same, pump means connected to the motor by a pressure line, a control valve in the line, a return-flow bypass in the pressure line normally returning fluid flow to the inlet side of the pump means, bypass throttling means responsive to the line pressure for holding a line pressure to a motor actuating degree, and means operable upon opening the control valve to develop a line pressure for rendering said bypass throttling means initially operative.

12. The combination with an engine of a motor vehicle, a windshield wiper having a hydraulic motor for driving it, an engine-driven pump connected to the wiper motor by a pressure line for wiper operation, a control for the wiper motor, and means responsive to the control for reducing the torque load of the pump on the engine when the use of the wiper is discontinued.

13. The combination set forth in claim 12, wherein the control is arranged to close the pressure line for arresting the wiper, and said responsive means includes pressure relieving means when the wiper is arrested and is connected into the conduit means between the control and the wiper motor to be hydraulically responsive following the opening of the conduit means by said control.

14. A windshield cleaning system comprising a wiper, a hydraulic motor for driving the same, engine driven pump means, a sump connected in fluid circuit with the motor and the pump means, a pressure line for motor operation and a return flow back to the sump, a normally closed control valve in the pressure line, bypass means operable for returning fluid to the pump means to reduce the load on the engine when the wiper is not in use, a hydraulic coupler responsive to the wiper operating pressure line to restrict the bypass means for maintaining the desired line pressure for such wiper operation, and fluid means operable upon the opening of the control valve to render the coupler operative for wiper operation.

15. A windshield cleaner according to claim 1, wherein flow-metering means are provided in the hydraulic circuit for the windshield wiper motor to hold a substantially constant speed under varying conditions of load.

16. In a motor vehicle, the combination with vehicle-engine-driven pump means providing a continuously operating primary hydraulic circuit, the arrangement being such as to include a selectively operable accessory hydraulic circuit, a hydraulic windshield cleaner system having a wiper, a driving motor therefor and a motor control in the accessory circuit, said accessory circuit having a bypass about the wiper driving motor when the motor control is closed, and a hydraulic coupler normally operating to permit bypass flow during rest intervals of the wiper for automatically reducing the wiper system load on the vehicle engine but operable to restrict the bypass for raising the pressure in the accessory hydraulic circuit when the motor control is positioned for wiper operation.

17. In a windshield cleaning system for motor vehicles, an engine for driving said vehicle, a wiper, a hydraulic motor for oscillating the wiper, a pump assembly, conduits delivering high and low pressure fluid from said pump assembly, a fluid connection between one of said conduits and said hydraulic motor to deliver fluid to said motor, a normally closed control in said fluid connection, valving means for modifying the flow in said fluid connection to said hydraulic motor, a servo-motor for actuating said valving means, and a fluid connection between the other of said conduits and said servo-motor for initially energizing the servo-motor when said control opens the first fluid connection.

18. In a windshield cleaner system for a motor vehicle, an engine for driving said vehicle, a wiper, a hydraulic motor for oscillating the wiper, a pump assembly, high pressure and low pressure fluid delivery lines for delivering fluid from said pump assembly, a connection between one of said delivery lines and said hydraulic motor to deliver fluid under pressure to said motor, a normally inoperative control for closing said connection, means modifying the flow in said last-named delivery line to provide a motor operating pressure, and a connection between the other delivery line and the modifying means for actuating the latter for furnishing fluid at a predetermined range of pressures to said motor when said control opens said first connection.

19. In a windshield cleaner system for a motor vehicle, an engine for driving said vehicle, a wiper, a hydraulic motor for oscillating the wiper, a pump assembly, high pressure and low pressure fluid delivery lines for delivering fluid from said pump assembly, a connection between one of said delivery lines and said hydraulic motor to deliver fluid under pressure to actuate said motor, a normally inoperative control for closing said connection, valving means for modifying the flow in the last-named delivery line, servo-motor means for actuating said valving means, and a connection between the other delivery line and the servo-motor means for initiating the functioning of said valving means when said control opens said first connection.

20. In a windshield cleaner system for a motor vehicle, an engine for driving said vehicle, a wiper, a hydraulic motor for oscillating the wiper, a pump assembly having high and low pressure fluid delivered therefrom, a pressure line from said pump assembly to said oscillating motor for delivering fluid under pressure to said motor, a control normally closing the pressure line, a second pressure line from said pump assembly connected with the first pressure line, and a hydrostatic coupler in one of said lines adapted to be influenced by the fluid in the other line for regulating the fluid in the first line to provide a fluid pressure suitable for actuation of said hydraulic motor when said control opens the first pressure line, said coupler including valve means so influenced by the other line pressure for controlling the fluid pressure for wiper actuation.

21. A windshield cleaning system for a motor vehicle, an engine for driving the vehicle, a wiper, a hydraulic motor for oscillating the wiper, a pump assembly, a fluid circuit between the pump assembly and the hydraulic motor for delivering fluid under pressure to the motor for operating the same, a control for said fluid circuit to said motor, valving means for modifying the fluid pressure in said fluid circuit to reduce the load of the pump means on the engine when the control has shut off the wiper, a servo-motor for actuating said valving means to subject the fluid to a motor working pressure when the control has turned on the wiper, and means for delivering fluid under pressure from said pump assembly to said servo-motor for actuating the valving means for maintaining the fluid in said fluid circuit to the motor at such working pressure.

22. A windshield cleaning system for a motor vehicle, an engine for driving the vehicle, a wiper, a hydraulic motor for oscillating the wiper, a pump assembly, a fluid reservoir for supplying fluid to said pump, a fluid circuit between the pump assembly and the hydraulic motor for delivering fluid under pressure to the motor for operating the same, a discharge from said motor to said reservoir, a control for said fluid circuit to said motor, valving means for modifying the fluid pressure in said fluid circuit to reduce the load of the pump means on the engine when the control has shut off the wiper, a servo-motor for actuating said valving means to subject the fluid to a motor working pressure when the control has turned on the wiper, and means for delivering fluid under pressure from said pump assembly to said servo-motor for so actuating the valving means which maintains the fluid in said fluid circuit to the motor at such working pressure.

23. A windshield cleaner including a wiper, a system for actuating said wiper comprising a hydraulic motor for driving the same, engine driven pump means including a sump connected in fluid circuit with the motor, which circuit provides a pressure line for motor operation and a return flow back to the sump, a normally closed control valve in the pressure line, bypass means operable for returning fluid to the pump means to reduce the load on the engine when the wiper is not in use, a hydraulic coupler responsive to the wiper operating pressure line to restrict the bypass means when said normally closed control valve is open for maintaining the desired line pressure for said wiper operation, and fluid under pressure in said system operable upon the opening of the control valve to render the coupler operative to enable the fluid to operate said motor for wiper operation.

References Cited in the file of this patent
UNITED STATES PATENTS
2,131,341    Waters _____ Sept. 27, 1938